Oct. 5, 1965  D. R. PADOVANI  3,209,443
APPARATUS FOR PRODUCING A GAME DEVICE
Filed Jan. 29, 1963  6 Sheets-Sheet 1

DOMINIQUE R. PADOVANI
INVENTOR.

BY

Oct. 5, 1965       D. R. PADOVANI       3,209,443

APPARATUS FOR PRODUCING A GAME DEVICE

Filed Jan. 29, 1963       6 Sheets-Sheet 2

DOMINIQUE R. PADOVANI
INVENTOR.

Oct. 5, 1965   D. R. PADOVANI   3,209,443
APPARATUS FOR PRODUCING A GAME DEVICE
Filed Jan. 29, 1963   6 Sheets-Sheet 3

DOMINIQUE R. PADOVANI
INVENTOR.

BY
*Norman S. Blodgett*

DOMINIQUE R. PADOVANI
INVENTOR.

Oct. 5, 1965 D. R. PADOVANI 3,209,443
APPARATUS FOR PRODUCING A GAME DEVICE
Filed Jan. 29, 1963 6 Sheets-Sheet 5

DOMINIQUE R. PADOVANI
INVENTOR.

BY

Oct. 5, 1965                D. R. PADOVANI                3,209,443
                 APPARATUS FOR PRODUCING A GAME DEVICE
Filed Jan. 29, 1963                              6 Sheets-Sheet 6

DOMINIQUE R. PADOVANI
INVENTOR.

BY

United States Patent Office 3,209,443
Patented Oct. 5, 1965

3,209,443
APPARATUS FOR PRODUCING A GAME
DEVICE
Dominique René Padovani, 3 Bis Blvd. de Belgique,
Monte Carlo, Monaco
Filed Jan. 29, 1963, Ser. No. 254,654
6 Claims. (Cl. 29—238)

This invention relates to apparatus for producing a game device and, more particularly, to a machine for manufacturing a net device.

The securing of a meshed net to a handle or stick has been accomplished hitherto by inserting the handle through the meshes. The threads forming the meshes surround the handle; this arrangement is found in hammocks, butterfly nets, nets for various games, etc. In order that the meshes of a net may thus surround the handle, they must be suitably finished, which implies the use of nets manufactured by hand, usually of the so-called "fishing net" type. It is essential, in fact, that the ends of the net terminate in closed loops in order that they may engage the handle. Said conventional fitting cannot be used with more economical nets, manufactured mechanically, and cut to the desired lengths, since their cut ends necessarily include open meshes, by reason of the cut end terminating across the knots tying the meshes together instead of along the actual meshes.

The old method of securing a net over a handle leads to a device of doubtful strength because of the wear of the net as it rubs against the handle. There is also the drawback that the breadth of the handle is limited to the size of the meshes. On the other hand, for the reasons stated, articles made up of nets secured to sticks or handles in accordance with the prior practice are expensive, since it is necessary to use hand-made nets and to secure them by hand; in fact, the introduction of the handle through the meshes cannot be excuted by production methods. These and other difficulties experienced in the prior art have been obviated in a novel manner by the present invention.

It is, therefore, an outstanding object of the present invention to provide an apparatus for manufacturing an article including a net that permits manufacturing on an industrial scale.

Another object of this invention has for its object a novel apparatus for securing nets, whatever may be the size of their meshes, to a solid support such as a handle; furthermore, apparatus for producing invention also covers the articles of manufacture obtained in accordance with a novel method, chiefly fishing nets, hammocks, nets for games, net bags and the like, of which at least one end is secured to a handle, stick or the like resistant support.

A further object of the present invention is the provision of an apparatus for producing a device in which a net is secured to a handle in a rigid and reliable manner.

It is another object of the instant invention to provide an apparatus for using a method for securing a net to a support, irrespective of the size of the meshes.

It is a further object of the invention to provide apparatus for producing a netted article using inexpensive mechanically-produced nets of any desired length.

With these and other objects in view, as will be apparent to those skilled in the art, the invention resides in the combination of parts set forth in the specification and covered by the claims appended hereto.

The character of the invention, however, may be best understood by reference to one of its structural forms, as illustrated by the accompanying drawings in which.

In a general way, the present invention consists in spreading a meshed net over a surface on which is laid a handle element so as to cover the element with the portion of the net to be secured to it, after which there is laid over said net portion, a part, cooperating with the element, which accurately matches the shape of the handle. The said cooperating part is then clamped over the element and secured to the latter. An outstanding feature of the invention is the arrangement is parallelism on a carrier surface of a series of elements provided for the manufacture of a plurality of the articles; the series is covered by means of a single common length of a mechanical net; a cooperating part is then laid, clamped and secured on each element, after which the net is cut along suitable lines so as to separate the articles obtained from each other. The securing of the cooperating part to the corresponding stick may be brought about by screwing, riveting, gluing or any other known means, and possibly by several of such means.

In a highly practical embodiment of the invention, the securing of the cooperating parts over the corresponding elements is brought about mechanically (instead of being performed manually) by means of a machine acting simultaneously on one or more handles and cooperating net-clamping parts. For instance, it is possible simultaneously to rivet a cooperating part on each of the two elements secured to the two opposite ends of a net. The apparatus for the execution of the securing method according to the invention, includes an assembling table, the length of which is proportional to the number of net-including articles to be produced simultaneously. The assembling table is provided with means for positioning the handle elements and retaining them. This means consists of recesses formed in the table, the shape and size of which recesses being such that the supports may be housed in the recesses while the parts of the supports on which the cooperating parts are to be applied, remain flush with the table. Means is provided for a suitable spreading, as a uniform sheet, of the desired length of net over the surface of the table; this means may be advantageously made up of a series of small bosses, cones or studs, distributed longitudinally and/or transversely on the table, and adapted to engage the meshes of the net.

According to an embodiment of the invention, the assembling table is also provided with means for urging the net against a section of each element, and the elements against the table itself. This means may be made up of heavy removable wedges or hinged plates with a closing system which permits the plates to be pressed over the elements arranged on the table. These wedges or plates have a predetermined breadth so as not to cover the portion of the stick onto which the cooperating section is to be secured. The part to be played by said wedges or plates may be accomplished by buffers on a transfer-type machine controlled by hydraulic or electric means. Generally speaking, the assembling tables rest on suitable legs which raise them to a level readily accessible for the operator during processing.

According to one embodiment of the apparatus, the tables are made up of a movable chassis, which is adapted to be shifted between operative sections of a transfer-type machine, including, for instance, a riveting machine. The shifting is executed through the agency of a system of conveying roller, endless belts, or other known means.

According to my invention, it is possible to produce speedily, under good economical conditions, articles such as fishing nets, hammocks, game nets and various other similar articles. In such articles, the meshed net may be made of any desired material, such as textile, plastic, elastic, or metallic. The elements and the cooperating parts may be made of metal, wood, plastic material, or artificial board.

The supports and the parts cooperating therewith which form the essential components of the articles according to the invention, are not necessarily made of the same material; for reasons of thickness and mechanical resistance, and also for aesthetic reasons, it may be of interest to resort to a cooperating part made of a material different from that of the element; for instance, metal and wood or plastic and metal may be used. The element and its cooperating part may be given various shapes, such as a triangular shape, a trapezium, the arc of a circle or ny other flat geometrical figure. However, the simplest shape, which is at the same time of practical interest, is that where the surface of the stick or handle to which the net is to be secured, is rectilinear and is flattened. The contacting surfaces between the stick and the co-operating part may be flat, but it is advantageous, however, to give these surfaces a curvilinear, sinuous or toothed shape, with a view to more securely anchoring the net. In one embodiment of my invention, the co-operating part is provided with recesses and/or projections engaging corresponding projections and/or recesses of the stick. Thus, for instance, the element may be provided with projections such as bosses, fingers or studs, whereas openings are provided in the cooperating part for engagement by said projections; in such a case a high-strength engagement of the net may be obtained through the agency of glue, spread over the surfaces to be connected before the fitting of the cooperating net-securing part over the element.

Figure 1:
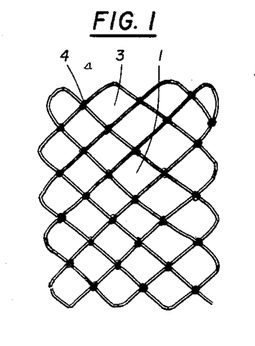
FIG. 1 is a plan view of a so-called "fisher's net"

Referring now to the figures, FIG. 1 shows a section 1 of a net of the so-called "fisher's net" type; the end meshes of said section, such as 3, are all finished and closed; in other words, none of the sides of the net section terminates at knots 4 but only along complete meshes 3 inside of which the support is caused to pass in accordance with the known procedure, so as to secure the net to said support. Such nets must be manufactured by hand.

Figure 2:
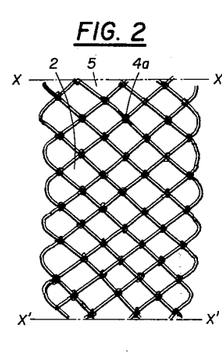
FIG. 2 illustrates a mechanically manufactured net.

FIG. 2 shows a section of a net 2 of the machine-made type, i.e., a net produced mechanically in pieces of a considerable length. The section 2 has been obtained by cutting from a long piece, the cuts being executed along lines XX and X'X". Consequently, it is obvious that the cut ends of the net pass through or close to the knots 4a and the open meshes 5. It is, therefore, impossible to introduce a stick or the like support through the end meshes 5. In the production of articles in accordance with the invention, the net 2 is perfectly suitable and it is not necessary to use more expensive nets of the fisher type.

Figure 3:
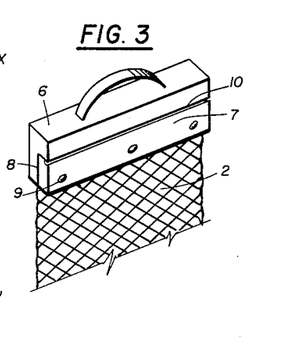
FIG. 3 is a perspective view of a portion of an article formed by a section of a net secured to a support in accordance with the principles of the present invention.

FIG. 3 shows the net 2 as secured to a handle or support element 6 by the clamping of the end of the net between a bearing surface 8 of the element and a co-operating part 7. In the perspective illustration, only the extreme left-hand edge of the bearing surface 8, forming part of the surface of the support element 6 covered by the cooperating part 7, can be seen. The cooperating part is secured to the element 6 and clamped over it by rivets 9 or the like.

Figure 4:
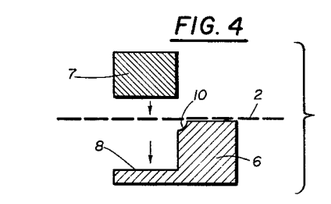
FIG. 4 is a cross-sectional view of the support illustrated in FIG. 3, before it is secured to the net.
Figure 5:
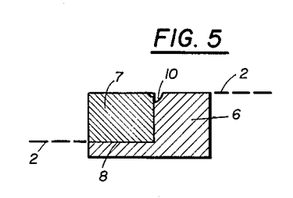
FIG. 5 is a cross-sectional view of the support illustrated in FIG. 3 after the net has been secured to it.

The end edge of the net, provided with open meshes 5 and cut along line XX (FIG. 2), is held between the bearing surface 8 of the support and the cooperating part 7. If required, the line XX along which the section is cut, may extend up to a groove 10 provided along the upper interengaging edges of the element 6 and the part 7. The construction of the article illustrated in FIG. 3 may be carried out by starting from a section cut beforehand as illustrated in FIG. 2. However, a more practical method consists in inserting such a machine-made net over the support element 6, as illustrated in FIG. 4 and then positioning the cooperating net-clamping part 7 (FIG. 5). This being done, a cutter blade is caused to pass through the groove 10 to cut the clamped section from the remainder of the net. It will be readily understood that this manner of operating permits the construction of a series of articles simultaneously, provided the desired number of support elements 6 are available, said supports being positioned at suitable intervals and being all covered by the same continuous net. A special arrangement for such an operation will be described hereinafter.

Figure 6:
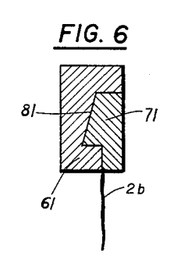
FIGS. 6 to 9 are cross-sectional views through four modifications of the invention.
Figure 7:
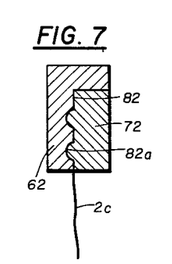
Figure 8:
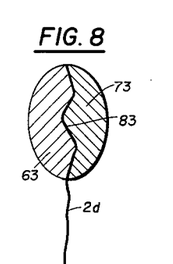
Figure 9:
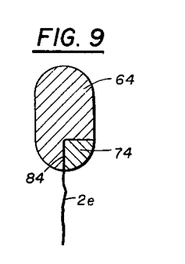

In FIGS. 6 to 10, I have illustrated a number of possible constructions of the support elements and the cooperating parts. FIG. 6 shows the cross-section of a support element 61 of which the bearing surface 81 is not flat but is serrated; furthermore, the cooperating part 71 is cut to show a cooperating serration which fits exactly in the recesses of the serration of the bearing surface 81. The net 2b is thus very tightly anchored between the element 61 and the part 71. FIG. 7 shows a further embodiment containing a support element 62 and a cooperating part 72 engaging each other along a bearing surface 82 provided with longitudinal grooves 82a and clamping a net 2c. The support element 63 illustrated in FIG. 8 is in the shape of a half oval with a serrated bearing surface 83, while the cooperating part 73 which has a similar and symmetrical shape which matches exactly the shape of the serrated bearing surface 83 and serves to clamp the net 2d. In the modification illustrated in FIG. 9, the support element 64 is formed as a stick having a generally oval cross-section and provided with a longitudinal groove 84 inside which is fitted a cooperating part such as a rod 74 forming the cooperating part which clamps a net 2e.

Figure 10:
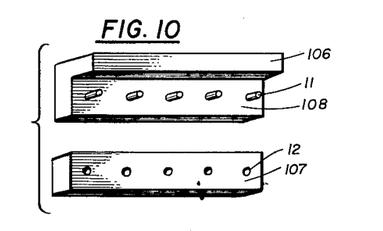
FIG. 10 is a perspective view of another modification of the support.

FIG. 10 is a perspective view of a support element 106 of the same type as that illustrated in FIGS. 3 to 5, but provided with a series of pegs 11; said FIG. 10 shows, furthermore, a cooperating part 107 provided with a series of bores 12 adapted to receive the pegs 11 exactly. The edge of the net is placed on the bearing surface 108 of the support element, so that the meshes may extend around the bosses 11. The cooperating part 107 is then fitted over the support 106 through engagement of the pegs 11 inside the bores 12. The parts are then clamped together and secured by means of rivets or the like, not illustrated. Consequently, the net is held not only through clamping but also through engagement of the meshes around the corresponding pegs 11. It may be preferable in some cases to secure the different parts together by means of glue spread over the bearing surface 108 and preferably also over the edges of the bosses. An article of a remarkable resistance is thus obtained.

Figure 11:
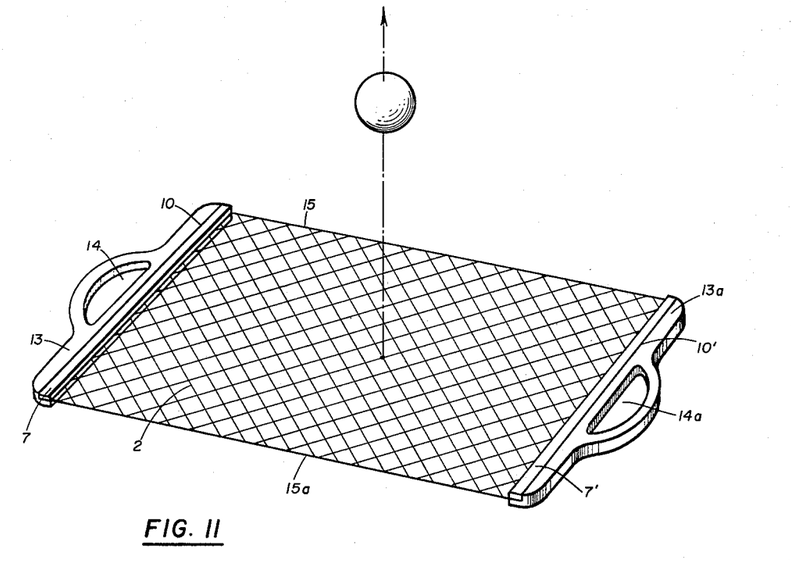
FIGS. 11 and 12 are views of a toy constructed in accordance with the invention and adapted to give an impetus to a ball in a game.
Figure 12:
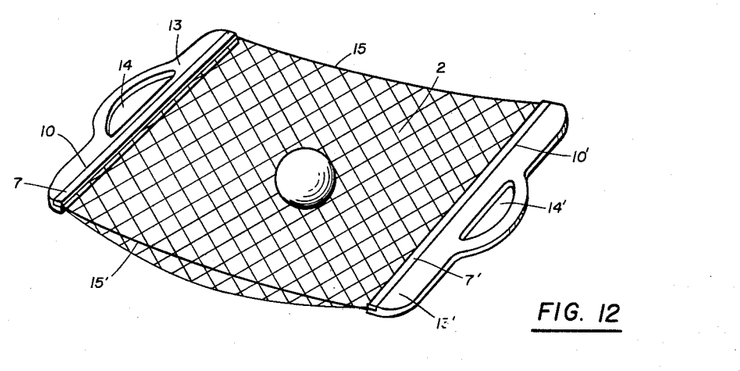

FIGS. 11 and 12 illustrate a novel game constituted by a section of the meshed net 2 secured at both ends to support elements 13 and 13a provided with handles 14 and 14a. The net 2 is provided with two elastic threads 15 and 15a which urge the elements 13 and 13a toward each other. In FIG. 11, the elastic strings 15 and 15a are stretched horizontally, whereas in the case of FIG. 12, they are released. When the handles are drawn outwardly so as to make the net pass from the condition illustrated in FIG. 12 to that illustrated in FIG. 11, a ball or a shuttle-cock carried on the net is projected upwardly. Such an arrangement is already known, but the game has never been constructed hitherto on a commercial scale by reason of the above-mentioned drawback, caused by the conventional manner of securing the net to its support elements. The present improved method permits the net to be easily constructed for this game in large amounts, while its strength allows it to serve well for sporting purposes. In the special form of the game illustrated in FIGS. 11 and 12, the net 2 is made of elastic threads; in contrast, the strings 15 and 15a are made of only slightly elastic material.

Figure 13:
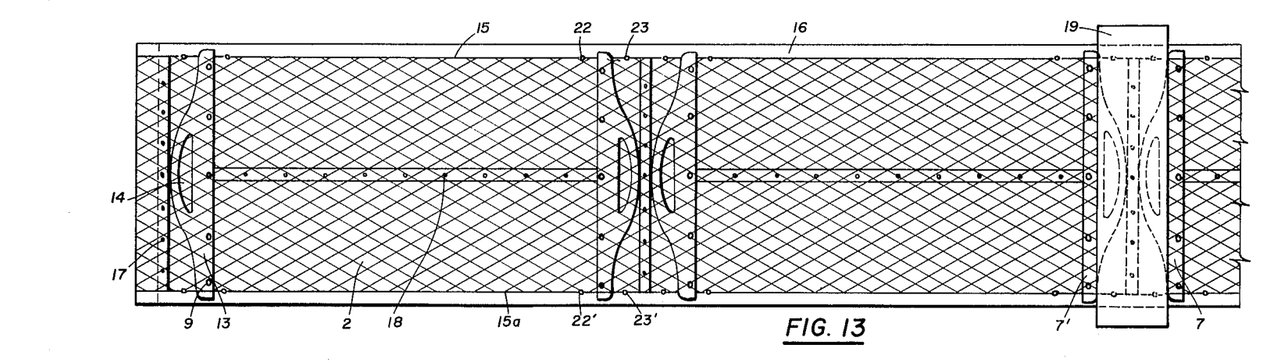
FIG. 13 is a view from above of a section of an assembling table constructed in accordance with the invention.
Figure 14:
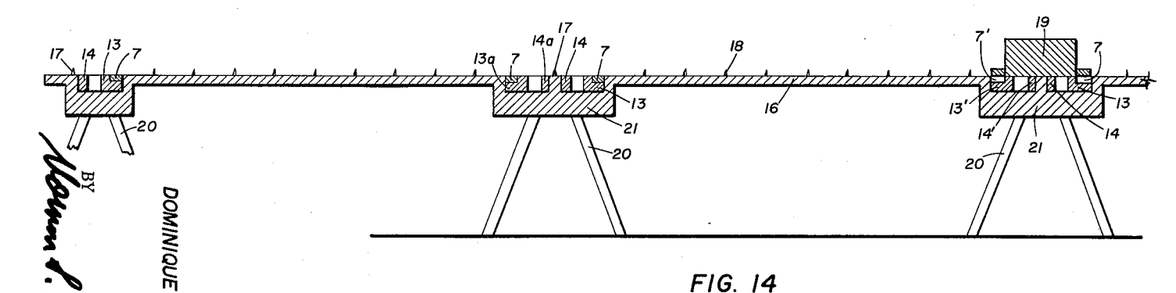
FIG. 14 is a longitudinal sectional view of the table illustrated in FIG. 13.

The apparatus for the performance of the improved method includes a table of which a portion is shown in plan view in FIG. 13 and in longitudinal sectional view in FIG. 14. In FIG. 14 is illustrated legs 20 carrying the upper board 16 of the table. In the embodiment illustrated, the arrangement includes reinforced sections or molds 21 between two successive elementary lengths of the upper board 16. Said molds are recessed so as to house accurately the support elements 13 and 13a with the corresponding handles 14 and 14a. The molds 21 form means for positioning and holding in position the support elements; the cross-section of FIG. 14 shows, as a matter of fact, that, during the construction of the net, the elements rest in the hollow parts of the molds, while their upper surfaces are flush with the board 16.

Studs 17 and 18 of a conical shape are secured to the upper board 16 of the table so as to serve as reference marks for the length of net to be used. The studs 17 are distributed along straight lines extending transversely across the ends of the desired length of net while the studs 18 are distributed longitudinally, thus resulting in the accurate positioning of the net both as to breadth and as to length. When clamping the net to its support elements, according to FIGS. 11 and 12 with the inclusion of elastic threads 15 and 15a, pairs of lateral guides 22, 23 and 22', 23' are secured to the table board to allow a correct positioning of the elastic threads. Simple heavy and removable clamps 19 are provided to urge the net 2 and the elements 13 against the surface of the table during operation; one of the said clamps is illustrated on the right-hand side of FIGS. 13 and 14.

Figure 15:
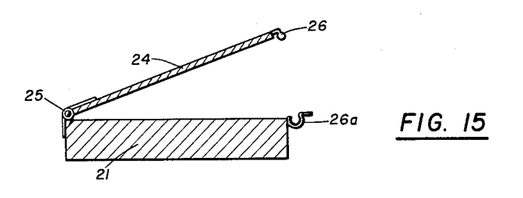
FIG. 15 is a transverse sectional view of an arrangement for clamping the net and the supports on the assembling table.

In another embodiment, illustrated in FIG. 15, the clamp consists of a plate 24 provided with a hinge 25 fastened to the mold 21 carried by the table. The plate 24 may be raised and lowered as desired and locked against the table by means of a tongue 26 and a clip 26a. The width of the clamp 19 or the plate 24 is selected so that they cover the support elements 13 and 13a except for those sections into which the cooperating parts 7 are to be secured.

Figure 16:
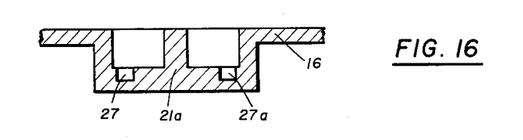
FIG. 16 is a cross-section showing a detail of the assembling table.

In the embodiment shown in FIG. 16, vertical recesses 27, 27a are provided in the lower ends of the mold 21a. Said recesses are located in registry with a number of bores 29 provided in the support element; the recesses have the same diameter as the bores to allow the introduction of removable guiding rods through bores into the recesses. The rods are inserted in the recesses 27 or 27' and their upper ends project well above the cooperating parts 7. The rods serve to position the support element and the cooperating part during assembly. In the example illustrated in FIGS. 13 and 14, neither the recesses 27, 27' nor the guiding rods are illustrated but, in practice, there is provided under each of two end bores 29 in each support element a recess 27 adapted to receive a removable rod. Furthermore, there are provided in the mold 21, underneath three other bores 29 in the support element, channels in which are fitted rods which extend through the bores.

Figure 17:
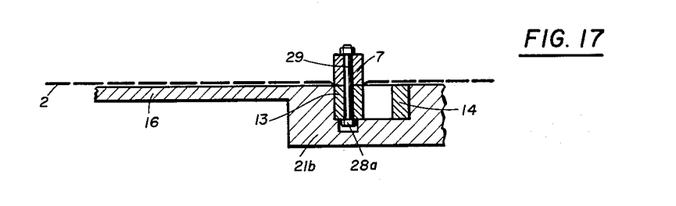
FIG. 17 is also a cross-sectional view of a section of the table showing how the net may be secured to the table.

In the embodiment illustrated in FIG. 17, each mold 21b is provided with recesses 28 registering with bores 29 in the support element to house a nut 28a into which is screwed a bolt passing through the bore 29 and a corresponding bore in the cooperating bore in the cooperating clamping part 7. The bottom of the recess 28 may also serve as an anvil in the formation of a rivet head on a rivet shank previously introduced into the bore 29 so as to secure the clamping member 7 to the support element.

The assembling table has a length selected in accordance with the number of articles which are to be formed in a single operation. By way of example and in the case of the net for the game illustrated in FIGS. 11 and 12 (which net measures about 80 cm., when the net is stretched between the lugs 14 and 14a), a table 4 or 8 m. long is used which allows making five or ten nets simultaneously, respectively. The width of the board 16 is equal or slightly greater than that of the support elements 13. However, it is possible to use a broader table on which two or more articles are formed in side-by-side relationship. This is particularly suitable in the case of articles provided with a net having a small width. For widths of more than 50 to 100 cm., a single row is preferable by reason of the easier access obtained thereto from either side of the table.

To make the article, the operator lays over the table in the recesses formed by the molds 21, as many pairs of support elements 13 as is permitted by the length of the table. This leads to the arrangement illustrated in FIGS. 13 and 14. A vertical rod, similar to the bolts inserted in the bores 29 of FIG. 17, is inserted in each of the five bores provided in the support elements 13. The three central rods are smooth and their lower ends are fitted in the mold 21. As to the two outer rods, they terminate at their lower ends in a head housed inside a recess similar to the recess 28 of FIG. 17, without, however, being secured to the mold. The two outer rods are provided with threads of high pitch. All the rods extend above the support elements 13 into the cooperating clamping parts 7. The table and all the support elements carried by it are then covered by a single net 2. The desired length of each net section is defined for each of the articles to be executed by the studs 17 and 18. For this purpose, a transverse row of meshes of the net are engaged over the first series of studs 17 on the left-hand side of the table illustrated in FIG. 13. This being done, the central meshes of the net are engaged over the side studs 18 until a further transverse row of meshes engages the second transverse series of studs 17. There is thus obtained for each article the same accurately determined number of meshes.

The parts of the net lying between two support elements 13 and belonging to two successive articles are then urged against said elements and against the table by heavy clamps 19 (or by plates 24) which hold the net and possible the lateral elastic threads forcefully against the support elements without, however, covering the bearing surfaces to which the cooperating parts 7 are to be secured.

The net-clamping parts 7, which are provided with five bores 29 in the same manner as the support elements 13, are fitted over the latter and their five bores are slid over the rods passing through the ports in the handles, as explained hereinabove. The three central rods allow a speedy adjustment of the cooperating clamping parts 7. On each of the two outer rods there is quickly screwed a winged nut which holds the handles and cooperating clamping members in their interengaged condition after removal of the article from the table.

In order to separate the articles thus formed from one another, it is only necessary to cut the net by means of a cutting blade engaging the groove 10 formed on one of the clamping parts. The articles are then removed from the table and the clamping parts are secured in a final manner to the handles or supports, for instance by riveting. All the operations described above are executed speedily and easily. They permit an uninterrupted production of hammocks, fishing or hunting nets, nets for game and the like with a reduced expenditure of labor.

In the particular case of the game illustrated in FIGS. 11 and 12, after the net 2 is laid over the assembling table, two elastic strings 15 are arranged throughout the length of the table along each edge of the net. The elastic strings are suitably positioned by resorting to the guides 22 and 23 (FIG. 13) so as to extend into transverse grooves not illustrated in the drawing, formed in the upper surface of the support elements 13. The threads are clamped in this position by the cooperating clamping parts 7. At the end of this operation, each of the elastic strings is hooked to the net, preferably by means of small rings, at a number of points.

Figure 18:
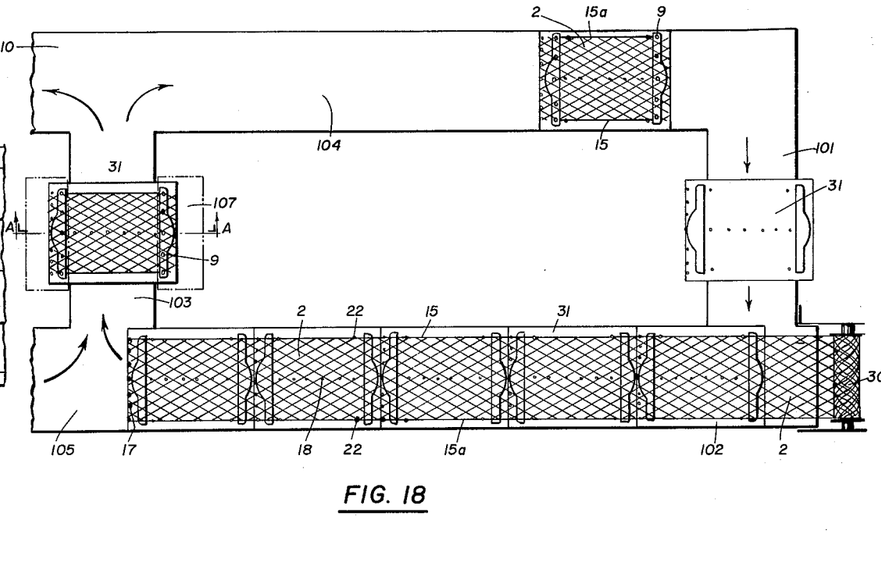
FIG. 18 is a diagrammatic plan view of an apparatus for continuous production of the article.
Figure 19:
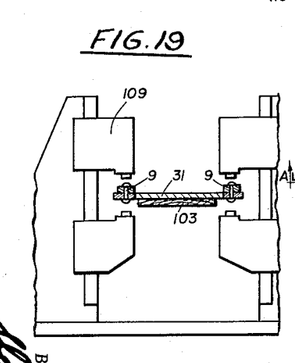
FIG. 19 is an elevational view of a riveting machine incorporated in the apparatus illustrated in FIG. 18.

In a further embodiment of the invention, the assembling table is made up of movable frames forming removable sections of a transfer-type machine. The frames are provided with the components to be united as a net article. The net-clamping parts 7 are secured to the support elements 13 preferably through riveting by mechanical means. The process may be performed continuously, provided the frame transferring machine is fed throughout operation with a succession of frames carrying a net, the support elements to be secured to the different sections thereof, and the net-clamping parts. FIGS. 18 and 19 illustrate diagrammatically a plant for the continuous production of articles according to the invention. The flow path is formed by the tables 101 to 104 provided with rolling means over which the frames 31 are caused to progress. Each frame 31 is formed as a section of the table 60 (FIG. 14) extending between two successive rows of studs 17. The circuit is provided with a reel from which the net 2 is unwound so as to be laid over the aligned empty frames 31 carried by the table 102. The table 103 lies between the jaws of a riveting machine 109 illustrated in elevational view in FIG. 19, which latter shows the frame along the section line A–A. The table 104 forming part of the closed circuit permits the removal of the articles produced on the frames 31; the empty frames are then fed over the table 101 toward the table 102 to be used again. The circuit described may be duplicated, in which case the riveting machine 109 is also fed with frames carried along a circuit including a table 105 arranged symmetrically with reference to the table 102, said last-mentioned circuit would be located on the left-hand side of FIG. 18 but is not illustrated. The riveting of articles originating in the table 105 is performed while frames are being provided with nets on the table 102. Similarly, at the output end of the riveting machine and to the left-hand side of the table 104, there is a table 110 similar to table 104 and which is connected with the table 105 through a table similar to 101. FIG. 18 shows a four-element circuit, but obviously the circuit may assume any other desired shape, for instance, a triangular shape, the table 104 sloping with reference to the table 102 and leading to a point near the reel 30, while the table 101 is cut out.

Figure 20:
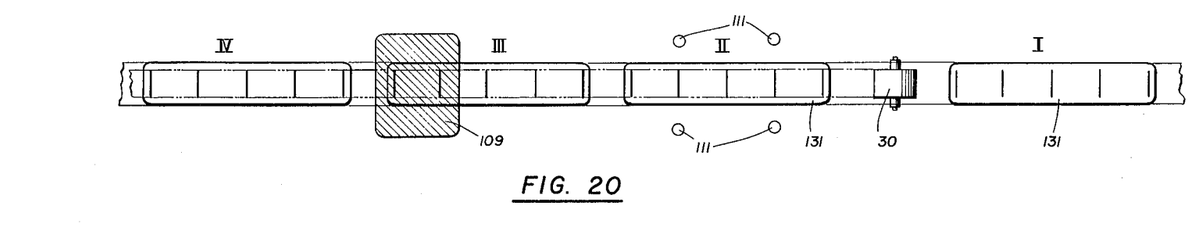
FIG. 20 is a diagrammatic plan view of a still further modification of the apparatus permitting continuous operation.

The frames 31 are individual frames, that is, they are adapted to carry each one article according to FIGS. 11 and 12. When a higher output per hour is required, it may be necessary to resort to frames adapted to carry a number of articles. As illustrated diagrammatically in FIG. 20, each of the frames 131 is designed for the production of four articles and is mounted on an endless belt conveyor. At the right-hand side, such a frame is shown empty as it enters the position I. It passes then under the reel 30 feeding the net 2 and stops in the preparation area II where the support elements are laid in position. After that the net 2 and the net-clamping parts 7 are positioned in their turn. These operations are executed by attendants standing, for instance, at the four points 111. The frame advances then into the position III inside the riveting machine 109 so as to secure the support elements to the cooperating clamping parts along with the strings 15 and 15a. In the final area IV, at the output end of the riveting machine, the four completed articles are removed, after which the frame returns in an empty condition to the area I.

Figure 21:
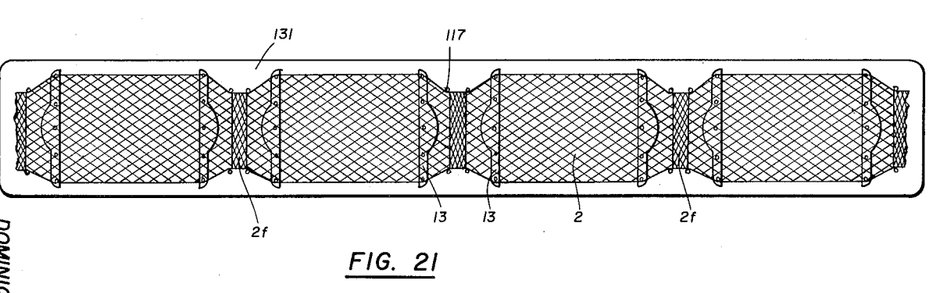
FIG. 21 is a plan view of a frame used in the apparatus shown in FIG. 20 and carrying four articles including a specially woven net.

FIG. 21 shows the detail of a frame 131 adapted to carry four finished articles, which frame consists of a modification of the arrangement illustrated in FIGS. 13 and 14. The length of the net 2 is no longer measured by the studs 18, but is predetermined by a special woven structure of the net. The latter includes, at predetermined intervals, sections 2f having smaller meshes adapted to be positioned between the support element 13 of one article and the support element 13a of the next article. The net is then held in position by a number of studs 117 provided in the area extending between the handles 13 and 13a.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Apparatus for producing a series of articles carrying nets between two support elements and net-clamping parts, comprising a table the length of which equals the total length of articles to be made at one time, means for positioning and securing the different support elements on the table, a plurality of series of studs carried along longitudinal and transverse lines of the table to define the location to be occupied by the net with reference to the table, and means for securing cooperating net-clamping parts on the corresponding supports laid on the table.

2. Apparatus for producing a series of articles carrying nets between two support elements and net-clamping parts, comprising a table the length of which equals the total length of articles to be made at one time, means for positioning and securing the support elements on the table, means for defining longitudinally and transversely the location to be occupied by the net with reference to the table, and hinged plates for securing cooperating net-clamping parts over the corresponding supports laid on the table.

3. Apparatus for producing a series of articles carrying nets between two supports elements and net-clamping parts, comprising a table the length of which equals the total length of articles to be made at one time, said table being provided with mold-shaped recesses in predetermined spaced relationship, the recesses matching the shape of the support elements to be carried therein, cooperating vertical channels being provided in the bottom of said recesses, in the support elements, and in the net-clamping parts, bolt and nut systems extending in said cooperating channels to secure each net clamping part in position with reference to the corresponding support element and to the table, means for defining longitudinally and transversely the location to be occupied by the net with reference to the table, and means for securing cooperating net-clamping parts over the corresponding support elements laid on the table.

4. Apparatus for producing a series of articles carrying nets between two support elements and net-clamping parts, comprising a table the length of which equals the total length of articles to be obtained simultaneously, means for positioning and securing on the table the different support elements, means for defining longitudinally and transversely the location to be occupied by the net with reference to the table, a plurality of upstanding rods adapted laterally to engage the support elements and net-clamping parts, and means for securing cooperating net-clamping parts over the corresponding support elements laid on the table.

5. Apparatus for producing a series of articles carrying nets between two support elements and net-clamping parts, comprising a moving table having a plurality of frames, the length of the table equalling the total length of articles to be made at one time, a transfer machine through which the table frames are adapted to progress intermittently, means for positioning and securing on the frames the different support elements, means for defining longitudinally and transversely the location to be occupied by the net with reference to the frames, and means incorporated with the transferring machine for securing the net-clamping members in position over the corresponding support elements on the successive frames.

6. Apparatus for producing a series of articles carrying nets between two supports elements, and net-clamping parts, comprising a moving table including a plurality of frames, at least one pathway along which said frames are adapted to move intermittently, a transfer machine through which the table frames from the said pathway are adapted to progress intermittently, means for positioning and securing on the frames different support elements, means for defining longitudinally and transversely the location to be occupied by the net with reference to the frames, means incorporated with the transfer machine for securing the net clamping members in position over the corresponding support elements on the successive frames, and at least one reel of net adapted to feed said net onto the frame lying in a predetermined part of the pathway adjacent the said reel.

References Cited by the Examiner

UNITED STATES PATENTS

| | | | |
|---|---|---|---|
| 402,884 | 5/89 | Autrobus | 140—109 |
| 438,400 | 9/92 | Smith | 43—11 |
| 619,065 | 2/99 | Bjornsen | 43—11 |
| 1,198,256 | 9/16 | Moles | 29—238 |
| 1,808,035 | 6/31 | Guenard | 273—73.4 |
| 2,042,835 | 1/36 | Fox | 29—238 |
| 2,608,750 | 9/52 | Cluzel | 29—448 |
| 2,695,445 | 11/54 | Johnson et al. | 29—417 |

WILLIAM FELDMAN, *Primary Examiner.*

F. RAY CHAPPELL, MILTON S. MEHR, *Examiners.*